Patented Oct. 20, 1931

1,828,380

UNITED STATES PATENT OFFICE

HANS RÖTGER AND FRITZ STOEWENER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CATALYTIC PROCESS

No Drawing. Application filed July 28, 1928, Serial No. 296,091, and in Germany July 30, 1927.

The present invention relates to improvements in catalytic processes.

It is well known in the art that many catalytic reactions of gases can be improved by employing superficially active catalytic substances in a state of high porosity.

We have now found that the efficiency of such processes can be considerably increased by passing the gases or vapors to be treated over porous catalytic substances, the size of the pores of which decreases in the direction of the current of gases or vapors passed thereover. For example, a gel of alumina with wide pores can be combined with a fine-porous silica gel, or a wide-porous and a fine-porous silica gel can be arranged in series. Such superficially active substances can be employed solely or in conjunction with an activator, which may be effected for example by covering the former with a metal or by starting from one or more other metal oxids than are employed for the preparation of the porous catalytic substance. The catalytic substances can be fed into a single reaction chamber in the aforesaid manner or can be arranged in several reaction chambers connected with each other, the first reaction chamber containing the wide-porous and the last chamber the fine-porous catalytic substance. If desired, they can be also kept in motion, for example by passing them in counter-current to the gases or vapors.

The following examples will further illustrate how the invention may be carried out in practice, but the invention is not limited thereto.

Example 1.

A mixture of acetylene and ammonia is passed through 4 reaction tubes arranged in series and heated to about 350° C. In each reaction chamber the catalytic substances consist of silica gel with finely divided thoria and zinc oxid dispersed thereon, whereby in the first two reaction chambers a wide-porous gel is employed, whilst the 3rd reaction chamber contains a mixture of equal parts by volume of wide- and of fine-porous gel and the 4th reaction chamber a fine-porous gel solely. The yield of liquid condensation products amounts to about 85 per cent of the calculated amount in contrast to 57 per cent when employing an equal volume of a wide-porous and 68 per cent when employing a fine-porous gel solely.

Example 2

A gaseous mixture containing 60 litres each of acetylene and ammonia is passed at about 300° C. through two reaction chambers arranged in series, the first of which is fed with a wide-porous alumina gel, the second with the equal amount by volume of a fine-porous alumina gel. Per each litre of catalytic substance 43.7 cubic centimetres of nitrogenous condensation products are obtained, whilst under equivalent conditions of working as regards the composition of the initial material, the temperature and the speed of passing the gases, about 2/5 only of the said yield is obtained when employing a fine-porous gel solely, or about 1/4 when employing a wide-porous gel solely.

Example 3

A mixture of 1 part of sulfur dioxid and 9 parts of air is passed at about 475° C. over a catalytic substance consisting of silica gel covered with platinum prepared by loading each litre of the carrier with 6.25 grams of platinum chlorid and subsequent reduction. On arranging in series equal parts by volume of a wide-porous and a fine-porous catalytic substance which contain per each unit of volume an equivalent amount of platinum, a yield is obtained per unit of time and of volume of catalytic substance which amounts to about 80 per cent above that obtained in the same period of time when employing the same volume of a fine-porous gel solely and to about 45 per cent above that obtainable in the same period of time with the same volume of a wide-porous gel solely, the catalytic mass consisting of a fine-porous and a wide-porous activated silica gel allowing a complete conversion of far higher quantities of sulphur dioxide per unit of time and of catalytic substance, than can be obtained with the catalytic substances of different structure referred to above.

What we claim is:—

1. The process of carrying out a catalytic process in the gas or vapor phase which comprises passing the initial material through a layer of a porous catalytic substance, the pores of which decrease in size in the direction of the current of the initial material.

2. The process of carrying out a catalytic process in the gas or vapor phase which comprises passing the initial material at first through a layer of a wide-porous and subsequently through a layer of a fine-porous superficially active catalytic substance.

3. The process of carrying out a catalytic process in the gas or vapor phase which comprises passing the initial material at first through a layer of a wide-porous catalytically active inorganic gel and subsequently through a layer of a fine-porous catalytically active inorganic gel.

4. The process of carrying out a catalytic process in the gas or vapor phase which comprises passing the initial material at first through a layer of a wide-porous catalytic substance containing an activator and subsequently through a layer of a fine-porous catalytic substance containing an activator.

5. The process of carrying out a cataytic process in the gas or vapor phase which comprises passing the initial material at first through a layer of a wide-porous catalytically active silica gel and subsequently through a layer of a fine-porous catalytically active silica gel.

6. The process of carrying out a catalytic process in the gas or vapor phase which comprises passing the initial material at first through a layer of a catalytic substance comprising a wide-porous silica gel and an activator, and subsequently through a layer of a catalytic substance comprising a fine-porous silica gel and an activator.

7. The process of carrying out a catalytic process in the gas or vapor phase which comprises passing the initial material at first through a layer of a catalytic substance comprising a wide-porous silica gel and another metal oxid and subsequently through a layer of a catalytic substance comprising a fine-porous silica gel and another metal oxid.

8. The process of catalytically oxidizing sulfur dioxid which comprises passing sulfur dioxid together with a gas comprising oxygen at first through a layer of a wide-porous silica gel impregnated with platinum and then through a layer of a fine-porous silica gel impregnated in the same manner.

In testimony whereof we have hereunto set our hands.

HANS RÖTGER.
FRITZ STOEWENER.